US005272587A

United States Patent [19]

Wan

[11] Patent Number: 5,272,587

[45] Date of Patent: Dec. 21, 1993

[54] EXTENSION SOCKET

[76] Inventor: Hwan J. Wan, P.O. Box 82-144, Taipei, Taiwan

[21] Appl. No.: 910,517

[22] Filed: Jul. 8, 1992

[51] Int. Cl.[5] ........ H02H 3/22

[52] U.S. Cl. ........ 361/111; 361/56; 439/620

[58] Field of Search ........ 361/111, 115, 56; 439/620

[56] References Cited

U.S. PATENT DOCUMENTS 4,814,941 3/1989 Speet et al. ........ 361/111
4,999,729 3/1991 Stifter ........ 361/56

*Primary Examiner*—Todd Deboer
*Attorney, Agent, or Firm*—Alfred Lei

[57] ABSTRACT

This invention relates to an extension socket and in particular to one including a base, a pair of conducting plates, a grounding plate, an overload protector, a light-emitting diode, a pulse absorber and a cover, whereby both sides of the extension socket may be connected with electrical plugs hence reducing its size and making it convenient to connect with electrical plugs in any position. Further, the overload protector and the pulse absorber may prevent the extension socket from being damaged by excess current passing therethrough.

2 Claims, 5 Drawing Sheets

EXTENSION SOCKET

BACKGROUND OF THE INVENTION

It has been found that the conventional extension socket has the following drawbacks:

1. The plug can be inserted only in a single side of the extension socket thereby making it inconvenient to connect the plug with the socket.

2. As only one side of the extension socket can be connected with the plug, the extension socket will be possessed of a relatively large size hence rendering it difficult to be stowed and transported.

3. The extension socket cannot be used as a switch.

4. The conducting plate of the extension socket is in point contact with the prong of the plug thus causing it unable to engage with the plug firmly after used for a certain period of time.

5. The extension socket does not have a pulse absorber and may be damaged by the transient current.

Therefore, it is an object of the present invention to provide an improved extension socket which may obviate and mitigate the above-mentioned drawbacks.

SUMMARY OF THE INVENTION

This invention relates to an improved extension socket.

It is the primary object of the present invention to provide an extension socket on both sides of which may be inserted a plurality of plugs.

It is another object of the present invention to provide an extension socket which is compact in size.

It is still another object of the present invention to provide an extension socket which is convenient to stow.

It is still another object of the present invention to provide an extension socket which has an overload protector.

It is still another object of the present invention to provide an extension socket which has a pulse absorber.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
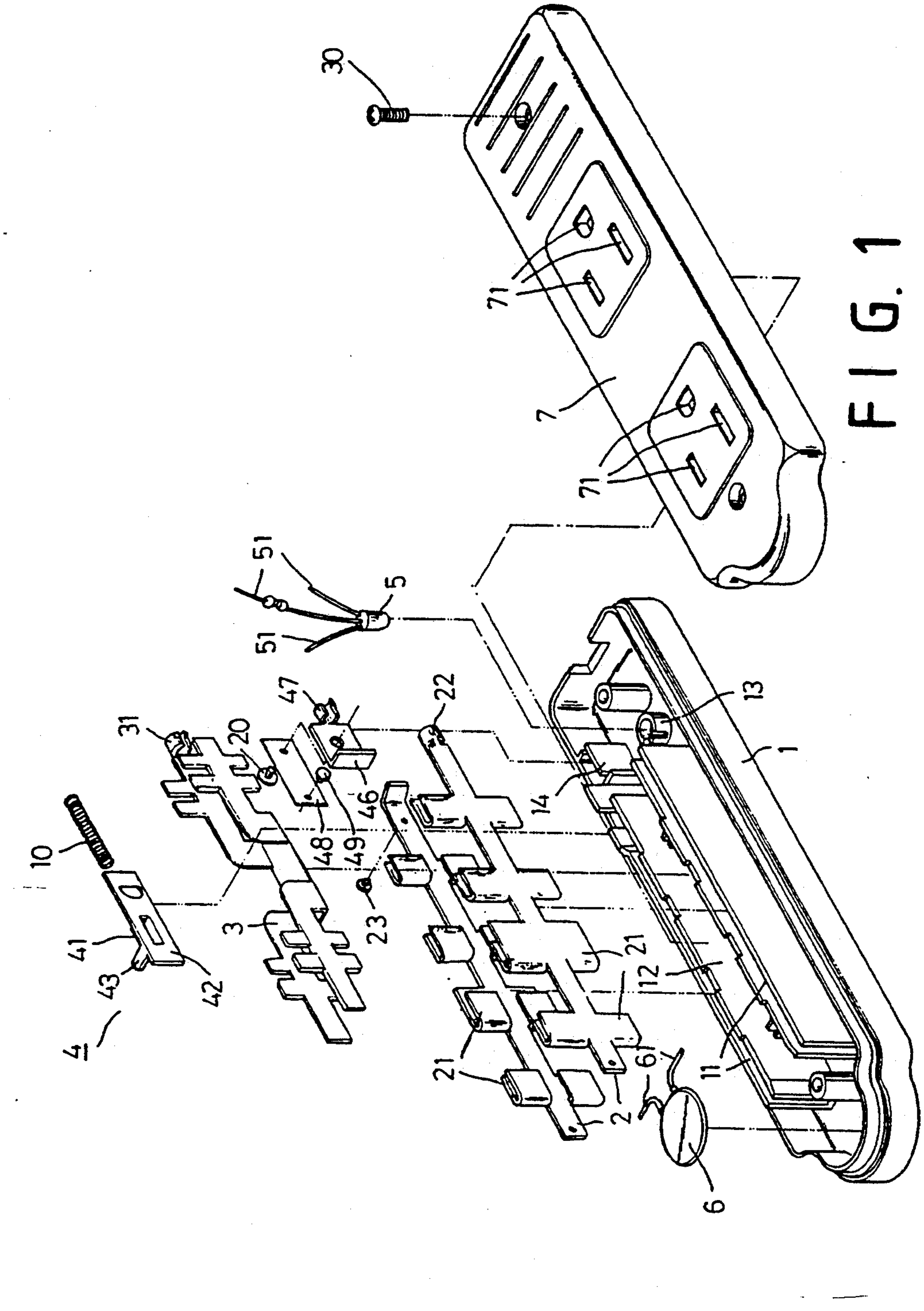
FIG. 1 is an exploded view of the present invention.
Figure 2:
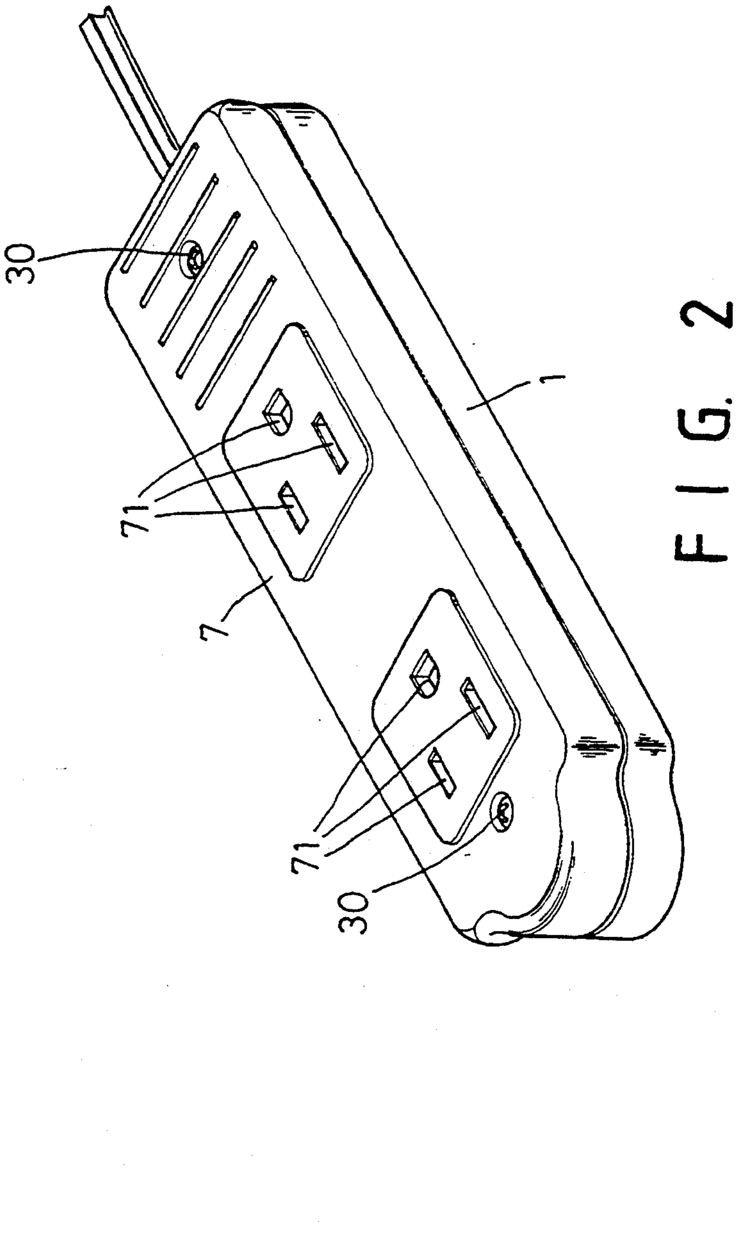
FIG. 2 is a perspective view of the present invention.
Figure 3:
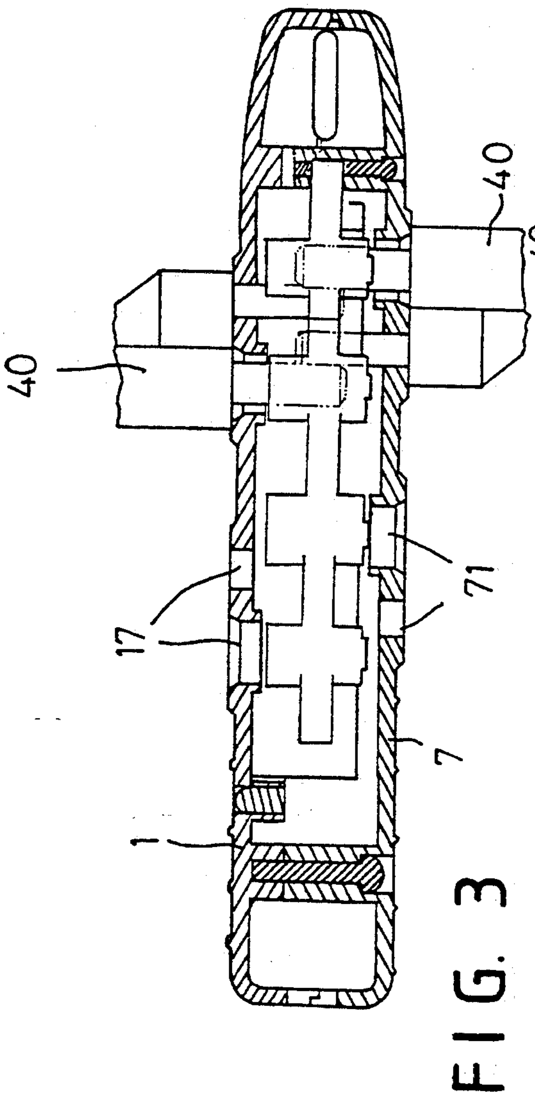
FIG. 3 is a sectional side view of the present invention.
Figure 3A:
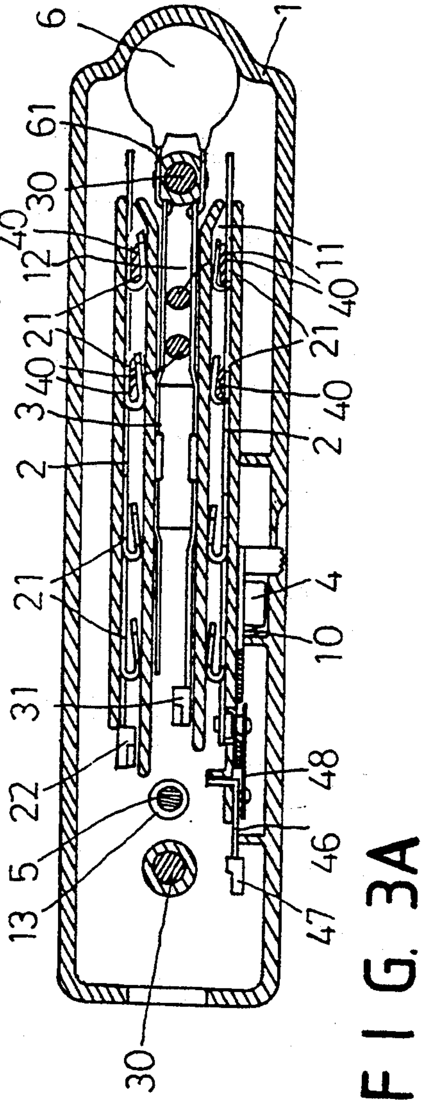
FIG. 3A is a sectional top view of the present invention.

With reference to the drawings and in particular to FIGS. 1 and 2 thereof, the receptable according to the present invention mainly comprises a base 1, two conducting plates 2, a grounding plate 3, an overload protector 4, a light-emitting diode 5, a pulse absorber 6, and a cover 7.

The base 1 is formed with two side grooves 11, a central recess 12 between the two side grooves 11, a cylindrical member 13, a vertical plate 14, a first partition 15, a second partition 16, and a plurality of slots 17.

The conducting plate 2 is inserted into the side groove 11 of the base 1 and has a plurality of U-shaped members 21. Further, one of the conducting plates 2 is connected with an electrical wire at one end 22 while the other one with a rivet 23.

The grounding plate 3 is disposed within the central recess 12 of the base 1 and has an end 31 connected with a grounding line (not shown).

Figure 4:
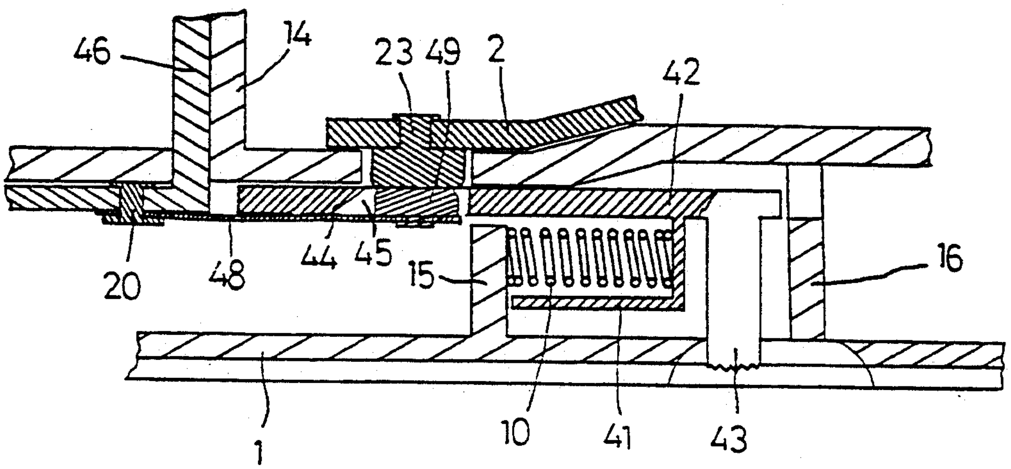
FIG. 4 shows the closed state of the overload protector.

The overload protector 4 has a frame 41 arranged between the first partition 15 and the second partition 16 (see FIG. 4). The top end of the plate 42 is provided with a push member 43 extending through the base 1. The other end of the plate 42 has a hole 45 and an inclined surface 44. A spring 10 is mounted between the first partition 15 and the frame 41. An engaging member 46 has an end 47 connected with an electrical wire and is riveted on the metal plate 48. The metal plate 48 is in turn riveted on an upper contact 49 so that the upper contact 49 is opposite to a lower contact 23 and the plate 42 is disposed therebetween.

The light-emitting diode 5 is fitted into the cylindrical member 13 and has legs 51 connected with the conducting plates 2 and an end 47 of an engaging member 46.

The pulse absorber 6 is mounted in the base 1 and connected with the conducting plates 2 and a grounding plate 3.

The cover 7 is fixedly mounted on the base 1 by bolts 30 and has a plurality of slots 71 which are not aligned with the slots 17 of the base 1.

Figure 5:
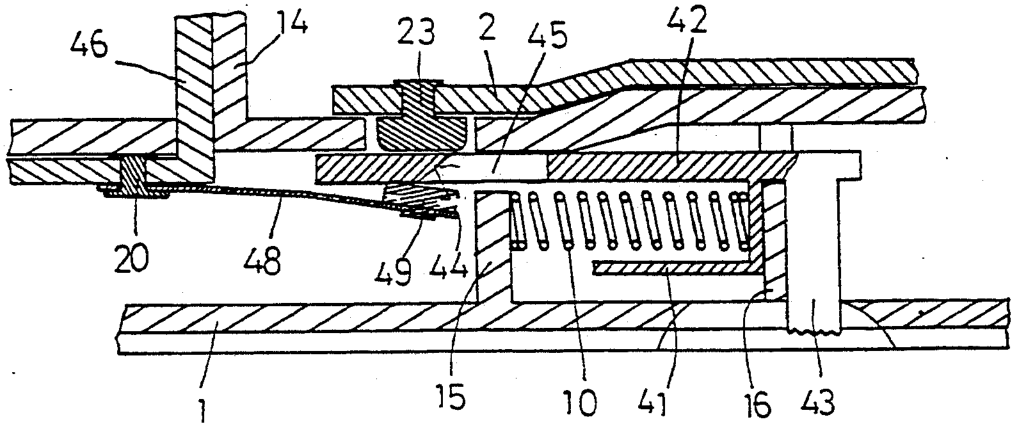
FIG. 5 shows the open state of the overload protector.
Figure 6:
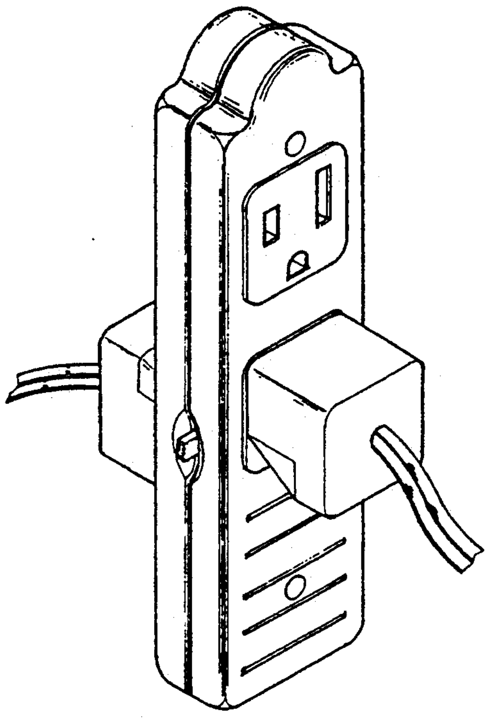
FIGS. 6 and 6A are working views of the present invention.
Figure 6A:
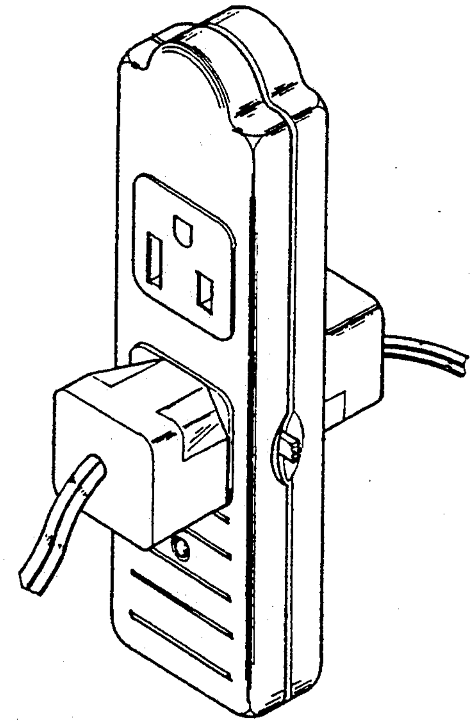

The prongs of a plug 40 may be conveniently put into the slots 17 on the base 1 or the slots 71 on the cover 7 to engage with the U-shaped member 21. In the meantime, the upper contact 49 extends through the hole 45 of the plate 42 to connect with the lower contact 23 (shown in FIG. 4) so that the current may flow from the engaging member 46 to the conducting plate 2 through a metal plate 48. The metal plate 48 will be deform when subjected to heat and so when there is an excess current passing therethrough, the metal plate 48 will be deformed thereby separating the upper contact 49 from the lower contact 23. Hence, the plate 42 will be urged by the spring 10 to move thus moving the seat 41 against the second partition 16. As the plate 42 is moved, the hole 45 and the inclined surface 44 will be separated from the upper contact 49 hence moving away from the upper contact 49 and lower contact 23 and therefore cutting off the circuit (see FIG. 5). When the overload disappears, it is only necessary to push the push member 43 to its original position so that the upper contact 49 and lower contact 23 are in contact through the hole 45. However, it is understood that the push member 43 may be manually pushed to separate the two contacts 49 and 23 to form an ON-OFF switch.

The light-emitting diode 5 is connected with a well-known circuit (not shown) so that the light-emitting diode 5 will emit green light in closed circuit and red light in open circuit thereby displaying the state of the circuit. Further, the transient current through the U-shaped member 21 will be absorbed by the pulse absorber 6 hence preventing the other components from being damaged. The pulse absorber 6 is also well known in the art and has no need to be described here in detail.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. An extension socket comprising a base, a pair of conducting plates, a grounding plate, an overload protector, a light-emitting diode, a pulse absorber and a cover, characterized in that:

said base being formed with two side grooves, a central recess between the two side grooves, a cylindrical member, a vertical plate, a first partition, a second partition, and a plurality of slots;

one of said conducting plates being riveted with a lower contact;

an overload protector having a frame arranged between said first partition and said second partition and a plate provided with a push member extending through said base, the other end of said plate having a hole and inclined surface, a spring disposed between said first partition and said frame, an engaging member having an end connected with an electrical wire and is riveted on a metal plate, said metal plate being riveted on an upper contact so that the upper contact is opposite to a lower contact and the plate is disposed therebetween; and a cover fixedly mounted on said base and having a plurality of slots which are not aligned with the slots of said base.

2. The extension socket as claimed in claim 1, wherein said conducting plates are provided with a plurality of U-shaped plates for engaging with electrical plugs.

* * * * *